US012659562B2

(12) United States Patent
Tseng et al.

(10) Patent No.: US 12,659,562 B2
(45) Date of Patent: Jun. 16, 2026

(54) CAMERA MODULE WITH ENCAPSULATION BODY AND LENS ASSEMBLY

(71) Applicant: Luxvisions Innovation Technology Corp. Limited, Guangzhou City (CN)

(72) Inventors: Cheng-te Tseng, Guangzhou City (CN); Min-nan Yeh, Guangzhou City (CN); Yung-chou Chen, Guangzhou City (CN)

(73) Assignee: Luxvisions Innovation Technology Corp. Limited, Guangzhou City (CN)

( * ) Notice: Subject to any disclaimer, the term of this patent is extended or adjusted under 35 U.S.C. 154(b) by 34 days.

(21) Appl. No.: 18/804,248

(22) Filed: Aug. 14, 2024

(65) Prior Publication Data

US 2025/0358501 A1     Nov. 20, 2025

(30) Foreign Application Priority Data

May 16, 2024     (CN) .......................... 202410609462.7

(51) Int. Cl.
*H04N 23/55* (2023.01)
*H04N 23/54* (2023.01)
*H04N 23/57* (2023.01)

(52) U.S. Cl.
CPC .................................. *H04N 23/55* (2023.01)

(58) Field of Classification Search
CPC ........ H04N 23/51; H04N 23/54; H04N 23/57; H04N 23/50; H04N 23/60; H04N 23/00; H04N 23/90; H04N 23/55
See application file for complete search history.

(56) References Cited

U.S. PATENT DOCUMENTS 9,876,949 B2 * 1/2018 Wang ..................... H04N 23/51
2023/0007253 A1 * 1/2023 Wang ..................... H04N 19/85

* cited by examiner

*Primary Examiner* — Ahmed A Berhan
(74) *Attorney, Agent, or Firm* — The Roy Gross Law Firm, LLC; Roy D. Gross

(57) ABSTRACT

A camera module includes a sensor assembly, an encapsulation body, an optical filter, and a lens assembly. The sensor assembly includes a substrate and a sensor chip arranged on the substrate. The encapsulation body includes an encapsulation bottom and a light-transmitting portion, and the encapsulation bottom extends to the light-transmitting portion and is laminated on the substrate. The optical filter is located corresponding to the light-transmitting portion and disposed on the substrate and facing the sensor chip. The lens assembly is arranged on the encapsulation body, which in turn reduces the overall size of the camera module.

9 Claims, 10 Drawing Sheets

CAMERA MODULE WITH ENCAPSULATION BODY AND LENS ASSEMBLY

CROSS REFERENCE TO RELATED APPLICATIONS

This application claims priority to China Patent Application No. 202410609462.7, filed May 16, 2024, the disclosure of which is incorporated herein by reference in its entirety.

BACKGROUND OF INVENTION

1. Field of Invention

The present application relates to a camera device, and particularly to a miniaturized camera module.

2. Related Art

With the development of camera technologies, camera modules are widely used in camera devices for various purposes. The combination of camera modules with various portable electronic devices such as mobile phones and computers is favored by consumers.

Camera modules generally include lens barrels and optical elements received in the lens barrels. As sensor bases, image sensors, and electronic components occupy the same area on sensor substrates, the size reduction of the overall camera modules in the X-axis and Y-axis is limited, which is not conducive to the development trend of compact and lightweight electronic devices.

SUMMARY OF INVENTION

An object of the present application is to provide a camera module that is structurally integrated through different process steps to change a stacking structure and achieve a reduced size.

To achieve the above-mentioned object, an embodiment of the present application provides a camera module including a sensor assembly, an encapsulation body, an optical filter, and a lens assembly. The sensor assembly includes a sensor chip and a substrate, and the sensor chip is arranged on the substrate. The encapsulation body includes an encapsulation bottom and a light-transmitting portion, and the encapsulation bottom extends to the light-transmitting portion and is laminated on the substrate. The optical filter is located corresponding to the light-transmitting portion, and the optical filter is disposed on the substrate and faces the sensor chip. The lens assembly is arranged on the encapsulation body.

Optionally, the light-transmitting portion passes through two opposite sides of the encapsulation body, and the encapsulation body includes a flange located adjacent to the light-transmitting portion and extending toward the light-transmitting portion. The optical filter is arranged between the flange and the substrate, and the flange covers edges of the optical filter.

Optionally, the substrate includes a first side and a second side arranged opposite to each other and a hollow portion located corresponding to the optical filter and passing through the first side and the second side, and the sensor chip is arranged adjacent to the hollow portion, and a side portion of the sensor chip is connected to the first side of the substrate.

Optionally, the encapsulation body and the optical filter are arranged on the second side of the substrate, respectively, and the hollow portion is located between the optical filter and the sensor chip.

Optionally, the substrate includes a stepped portion, which is concave from the first side of the substrate toward the second side and is located adjacent to the hollow portion, and the side portion of the sensor chip is arranged on the stepped portion.

Optionally, the sensor assembly includes an electronic component arranged on the substrate, and the encapsulation body covers the electronic component.

Optionally, the lens assembly is arranged on the encapsulation body and includes a lens barrel and a driving element, and the lens barrel is movably connected to the driving element.

The present application further provides a camera module, including a sensor assembly, an encapsulation body, an optical filter, and a lens assembly. The sensor assembly includes a sensor chip and a substrate, and the sensor chip is disposed on the substrate. The encapsulation body is disposed on the substrate, the optical filter is disposed on the substrate and faces the sensor chip, and the lens assembly is disposed on the encapsulation body. The lens assembly includes a lens barrel and a driving element. The lens barrel includes a holding member arranged on a side wall of the lens barrel, and the driving element includes an actuating member. The holding member is held by the actuating member, and the actuating member is driven by the driving element to drive the lens barrel to move.

Optionally, the holding member protrudes from the side wall of the lens barrel and extends in a direction toward the actuating member of the driving element.

Optionally, a portion of the holding member is engaged with the actuating member of the driving element.

In the embodiments of the present application, the sensor chip of the camera module is disposed on the ceramic substrate through the flip chip process, so that a straight signal transmission path is formed between the sensor chip and the substrate, reducing the area required for horizontal wire bonding and for connecting contact pads to wire bonding pads of the substrate as used in prior art. In addition, the encapsulation body is laminated on the substrate through the molding process to directly cover the components on the substrate, reducing the assembly clearance required for the conventional sensor base and electronic components, thereby reducing the X-axis and Y-axis dimensions of the substrate, and providing better protection for the covered components. Furthermore, the lens barrel and the holding member are integrated, preventing the use of additional carriers, reducing the thickness of the carrier space for the driving element, and further reducing the X-axis and Y-axis dimensions of the entire camera module, thereby achieving the purpose of reducing the size of the camera module.

BRIEF DESCRIPTION OF DRAWINGS

To describe the technical solutions in the embodiments of the present invention, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

In order to facilitate understanding of the technical features, contents, advantages, and the effects of the present application that can be achieved, the present application is hereby described in detail as follows in conjunction with the accompanying drawings and in the form of embodiments. The drawings used therein are only for illustration and auxiliary explanation purposes and may not be the actual proportions and precise configurations after the implementation of the present application. Therefore, the proportions and configuration relationships of the drawings should not be interpreted to limit the scope of rights of the present application in actual implementation.

The following embodiments are referring to the accompanying drawings for exemplifying specific implementable embodiments of the present application. Directional terms mentioned in this application, such as "up", "down", "front", "back", "left", "right", "top", "bottom", "horizontal", "vertical", etc., are only directions by referring to the accompanying drawings. Therefore, the directional terms used are for explaining and understanding the present application, but not for limiting the present application. Throughout the specification and claims, unless the content clearly specifies otherwise, the meanings of "a", "an" and "the" include such descriptions as "one or at least one" of the stated elements or components. Furthermore, as used in this application, the singular article also includes the recitation of plural elements or components unless it is obvious from the specific context that a plurality is excluded.

The following will describe various embodiments of the present application with reference to the relevant drawings. For ease of understanding, the same elements in the following embodiments are described with the same symbols. It should be noted that the combination of various elements in the present application preferably forms the above-mentioned multiple embodiments, but this should not be interpreted as a limitation on the present application, that is, the various elements in the present application can also have more combinations and are not limited to the above-mentioned multiple embodiments.

Figure 1:
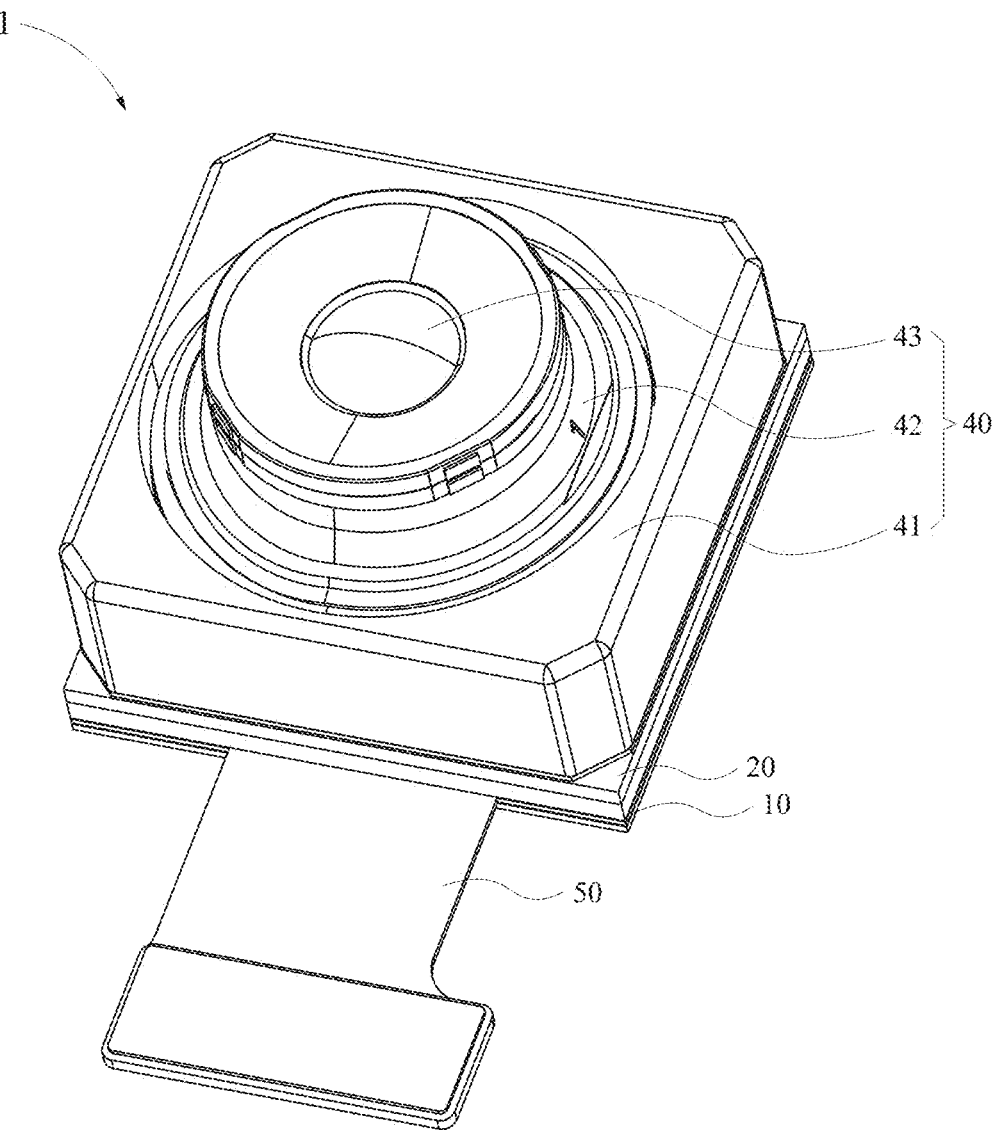
FIG. 1 is a schematic perspective assembly view of a camera module in an embodiment of the present application.
Figure 2:
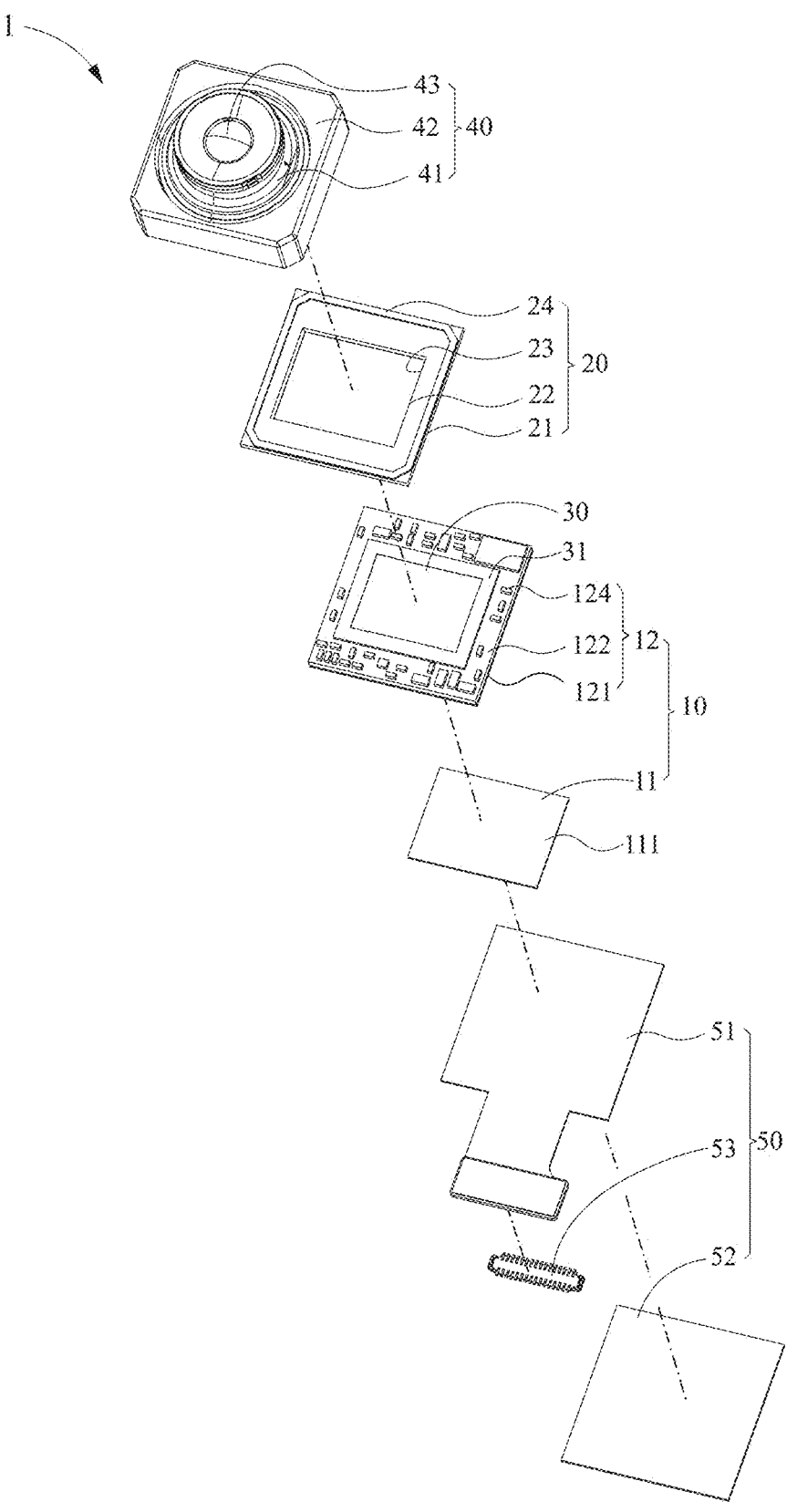
FIG. 2 is a schematic perspective exploded view of the camera module of FIG. 1.

The present application provides a camera module, which can be applied to be built into electronic devices such as smart phones, tablet computers, or notebook computers. Referring to FIGS. 1 and 2, FIG. 1 is a schematic perspective assembly view of a camera module in an embodiment of the present application, and FIG. 2 is a schematic perspective exploded view of the camera module of FIG. 1. As shown in FIGS. 1 and 2, an embodiment of the present application provides a camera module 1 including a sensor assembly 10, an encapsulation body 20, an optical filter 30, and a lens assembly 40. The sensor assembly 10 includes a sensor chip 11 and a substrate 12, and the sensor chip 11 is disposed on the substrate 12 for collecting incident light and generating image signals. In some embodiments, the substrate 12 is a circuit board made of a ceramic material. Exemplarily, the substrate 12 is a multilayer ceramic substrate, and the substrate 12 includes a first side 121 and a second side 122 that are oppositely arranged, and a hollow portion 120. A plurality of electronic components 124 (e.g., capacitors or resistors) are arranged on the second side 122 of the substrate 12. Specifically, the first side 121 is located below the second side 122, and the hollow portion 120 is located corresponding to the optical filter 30 and passes through the first side 121 and the second side 122, thereby forming the substrate 12 with an opening structure.

It is noted that the ceramic substrate has good machinability and strength characteristics, and is easy to form an open hollow portion 120 in the middle, and the size of the hollow portion 120 only needs to allow the visible area of the sensor chip 11 to sense the image without blocking the light path. In this embodiment, as shown in FIG. 2, the sensor chip 11 is disposed on the first side 121 of the substrate 12 and is adjacent to the hollow portion 120, and a side portion 111 of the sensor chip 11 is connected to the first side 121 of the substrate 12, so that the sensor chip 11 senses light from entering the camera module through the hollow portion 120. Such a configuration as designed allows passive components (such as electronic elements) to be placed on the substrate 12 closer to the center of the substrate 12, thereby reducing the dimensions of the substrate 12 on the X-axis and the Y-axis.

Still referring to FIGS. 1 and 2, the encapsulation body 20 includes an encapsulation bottom 21, a light-transmitting portion 22, and a flange 23. Specifically, the light-transmitting portion 22 passes through two opposite sides of the encapsulation body 20, the flange 23 is located adjacent to the light-transmitting portion 22 and extends toward the light-transmitting portion 22, and the encapsulation bottom 21 extends to the light-transmitting portion 22. The optical filter 30 is disposed on the substrate 12 corresponding to the light-transmitting portion 22 and faces the sensor chip 11. The lens assembly 40 is disposed on the encapsulation body 20.

Figure 3:
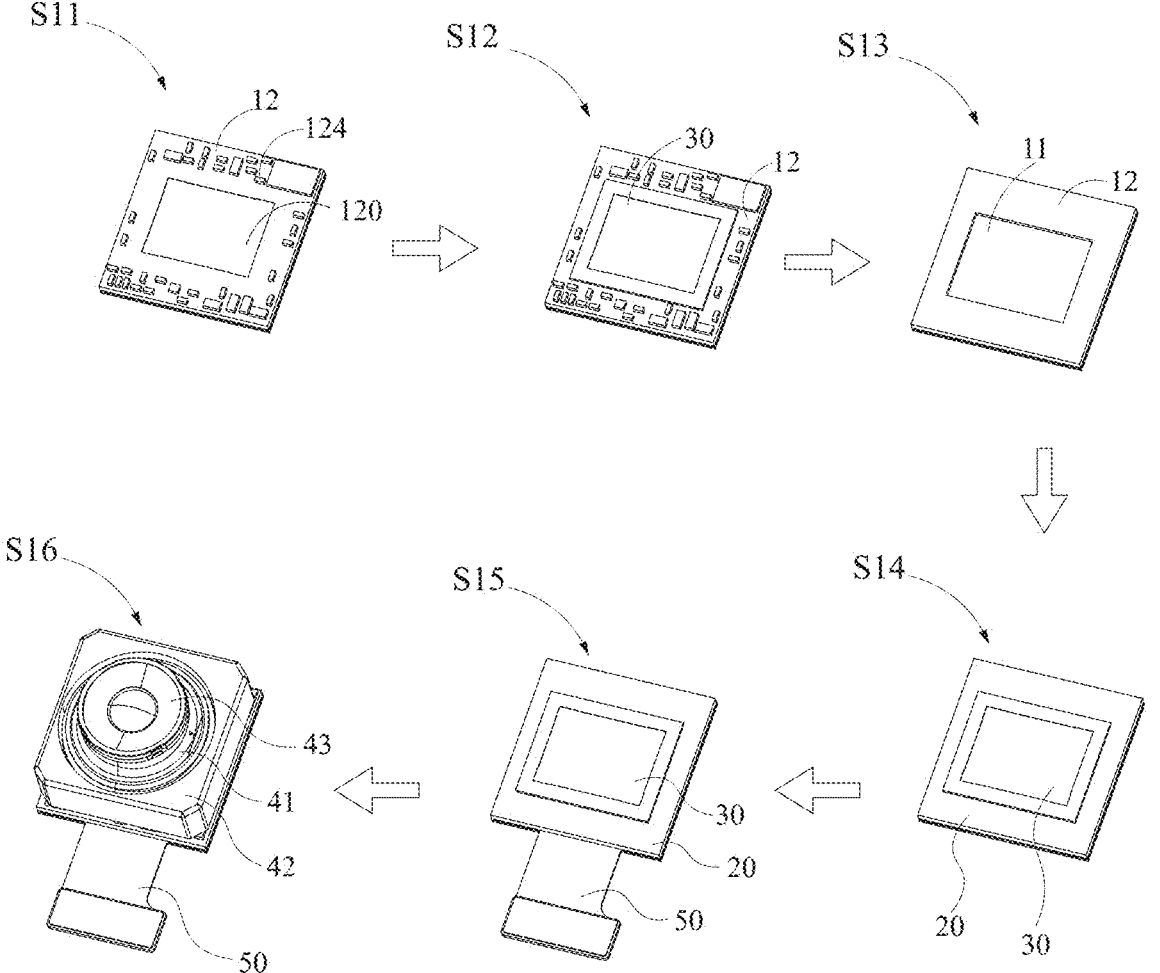
FIG. 3 is a schematic view showing an assembly process of the camera module in an embodiment of the present application.

Referring to FIG. 3, FIG. 3 is a schematic view showing an assembly process of the camera module 1 in an embodiment of the present application As shown in FIG. 3, the assembly from the upper left corner in the direction of the arrow mainly includes six steps, which are step S11, forming a hollow portion 120 on the substrate 12; step S12, setting the optical filter 30 on the substrate 12 to be corresponding to the hollow portion 120; step S13, mounting the sensor chip 11 on the substrate 12 by a flip chip process; step S14, packaging the encapsulation body 20 on one side of the substrate 12 and the optical filter 30 by a low-pressure molding (LPM) process and making the optical filter 30 being exposed to outside; step S15, assembling a connector assembly 50; and step S16, installing the lens assembly 40. It should be noted that the order of the assembly steps is not specifically limited and can be changed according to actual requirements.

Particularly, in the embodiment of the present application, the coupling and electrical connection between the substrate 12 and the sensor chip 11 can be achieved, for example, by a flip chip process. The flip chip process is a process in which a conductive component such as a conductive solder or a conductive adhesive is used to achieve electrical connection when the sensor chip 11 is mounted on the first side 121 of the substrate 12. In some embodiments, the conductive adhesive may be, for example, an anisotropic conductive film (ACF). The flip chip process refers to a process of forming conductive bumps on a chip without using wire bonding, and then making the conductive bumps contact with a substrate to connect the chip to a circuit of the substrate. The flip chip process enables a simpler structure and a thinner coupling area than the surface mount technology (SMT) process. Since the flip chip connection process is a known technology, additional description thereof is omitted. In detail, the sensor chip 11 in the embodiment of the present application is packaged through a flip chip process, and its contact pads are connected to wire bonding pads on the substrate 11. This allows signals to be directly connected in a straight up and down way, reducing the area required for horizontal wire bonding and for connecting the contact pads to wire bonding pads of the substrate when using conventional chip-on-board (COB) processes.

Figure 4:
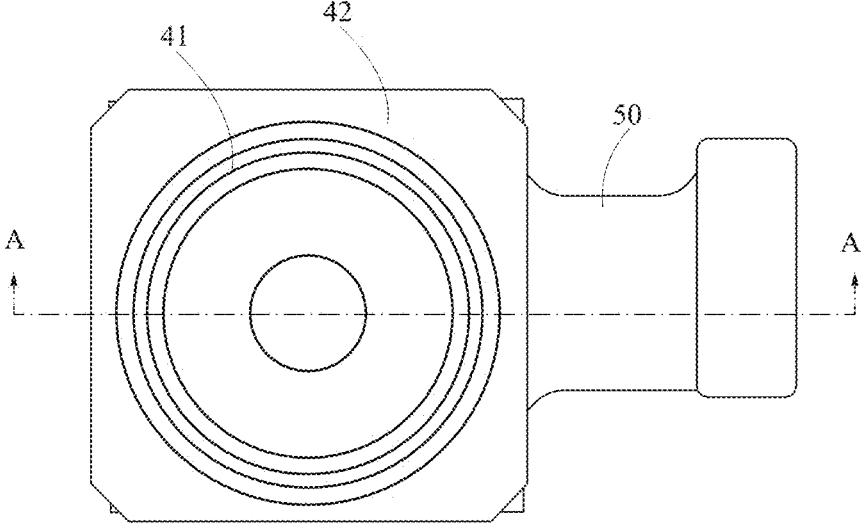
FIG. 4 is a schematic top plan view of the camera module of FIG. 1.
Figure 5:
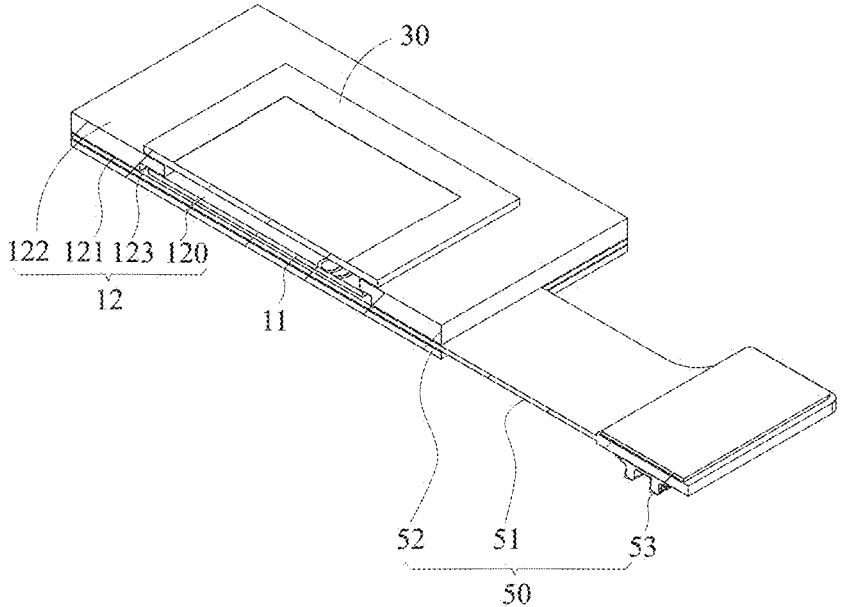
FIG. 5 is a partial perspective cross-sectional view taken along line A-A in FIG. 4.
Figure 6:
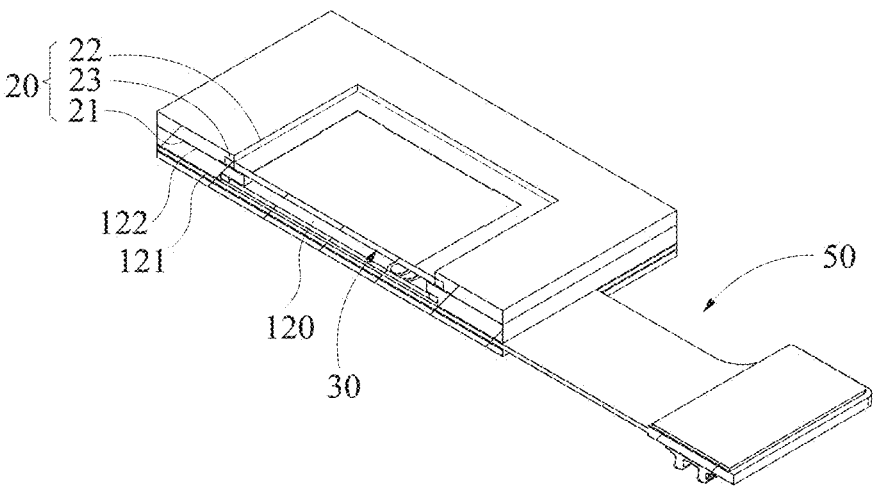
FIG. 6 is another partial cross-sectional view taken along line A-A in FIG. 4.
Figure 7:
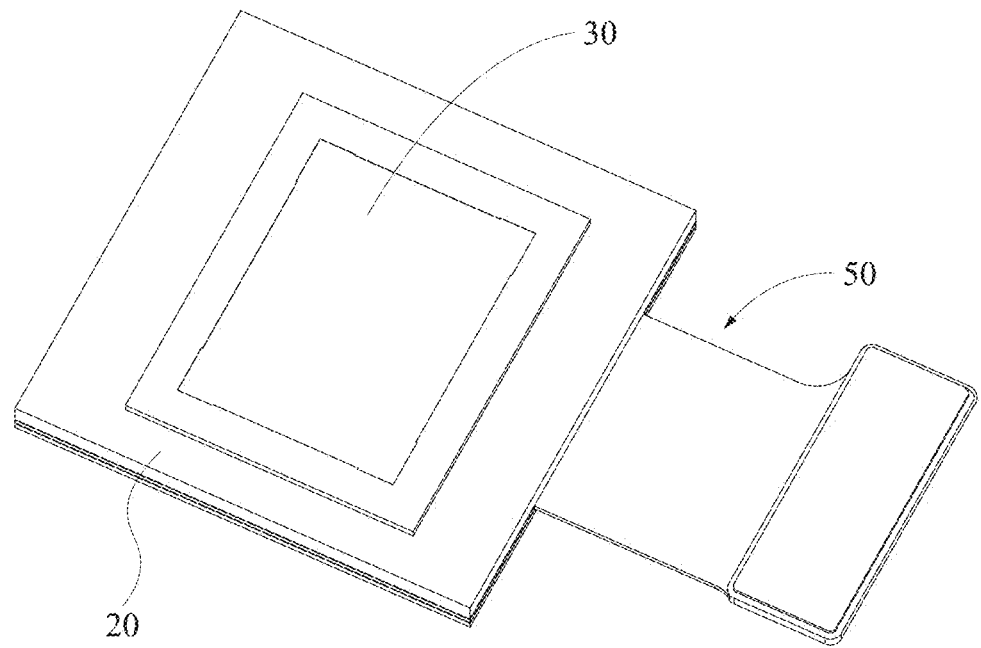
FIG. 7 is a partial perspective view of the camera module of FIG. 1.

Referring to FIGS. 4 to 7 in conjunction with FIG. 2, FIG. 4 is a schematic top plan view of the camera module 1 of FIG. 1, FIG. 5 is a partial perspective cross-sectional view taken along line A-A in FIG. 4, FIG. 6 is another partial cross-sectional view taken along line A-A in FIG. 4, and FIG. 7 is a partial perspective view of the camera module 1 of FIG. 1. As shown in FIG. 5, the sensor chip 11 and the optical filter 30 are disposed on a first side 121 and a second side 122 of the substrate 12, respectively, and a hollow portion 120 is defined therebetween. In detail, the optical filter 30 can filter the light within a specific wavelength range of incident light directly passing through a lens barrel, and the light having passed through the optical filter 30 may be incident to the sensor chip 11 disposed below the hollow portion 120. In some embodiments, the optical filter 30 may be an infrared optical filter that prevents infrared light from entering the sensor chip 11. In other embodiments, the optical filter 30 may be a blue light optical filter.

As shown in FIG. 5, the connector assembly 50 includes a cable element 51, a reinforcement plate 52, and a connector 53. For example, the reinforcement plate 52 may be attached to a lower portion of the cable element 51 and located on the first side 121 of the substrate 12 to improve the strength of the cable element 51. In some embodiments, the cable element 51 may be a flexible printed circuit board or a rigid-flex printed circuit board. In addition, the connector 53 is disposed at an end of the cable element 51 to be electrically connected to a mainboard (not shown) of an electronic device.

Still referring to FIGS. 5 and 6, as shown in FIG. 5, the substrate 12 includes a stepped portion 123, which is concave from the first side 121 toward the second side 122 and located adjacent to the hollow portion 120, and the side portion 111 of the sensor chip 11 is disposed within the stepped portion 123. As shown in FIG. 6, the encapsulation bottom 21 of the encapsulation body 20 is laminated on the substrate 12, and the flange 23 of the encapsulation body 20 covers an edge 31 of the optical filter 30, so that the optical filter 30 is disposed between the flange 23 and the substrate 12. It is particularly noted that the present application uses a low-pressure molding process, for example, to fill a mold with a plastic (PA) material having a Shore hardness of D70 to form the encapsulation body 20 laminated on the substrate 12 to directly cover the components, thereby reducing the assembly clearance required for a conventional sensor base and electronic components. In addition, a material filling method can achieve a minimum coating thickness, which is thinner than a wall thickness of the conventional sensor base, thereby reducing the X-axis and Y-axis dimensions of the substrate 12, and the molded encapsulation body 20 can more effectively protect the packaged electronic components.

Figure 9:
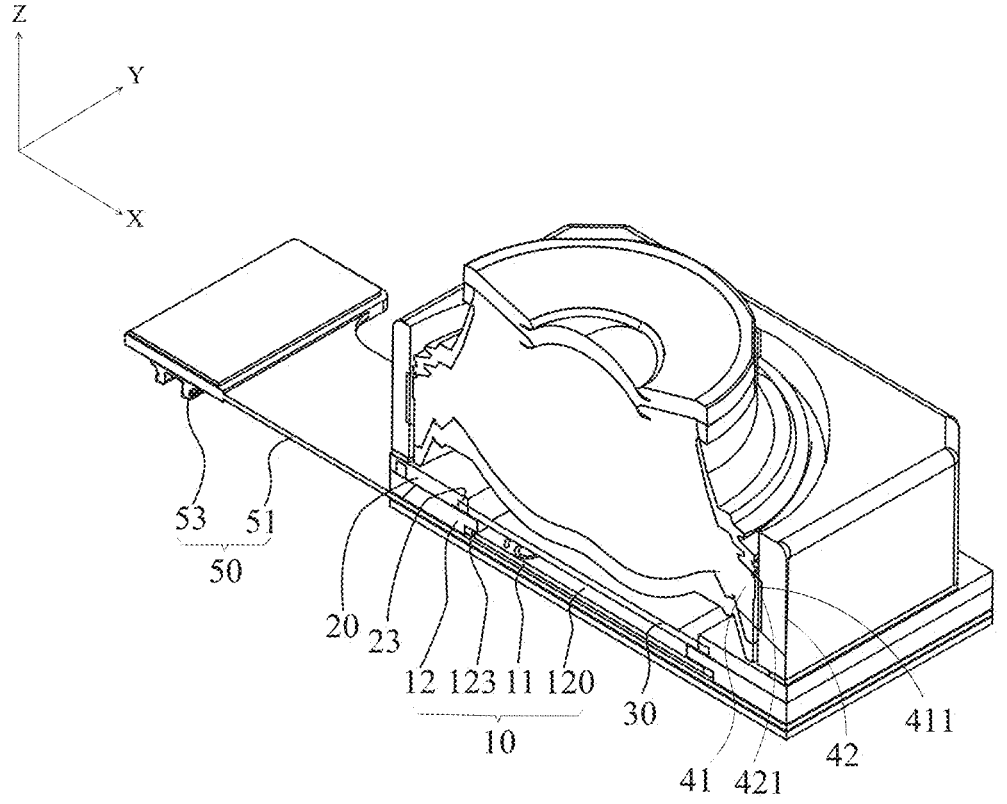
FIG. 9 is a schematic perspective cross-sectional view taken along line A-A in FIG. 4.

It is particularly noted that using the molding process to form the encapsulation body 20 packaging the substrate 12 to replace a conventional sensor holder has the advantage of reducing the height. Specifically, a conventional voice coil motor (VCM) camera is generally configured with electronic components on a circuit board, which gives rise to the insufficient adhesive fixing space at a bottom of the VCM camera. Therefore, a sensor substrate must be added to raise a VCM so that the bottom of the VCM can be completely adhesively fixed. However, this inevitably increases the structural height, including the assembly clearance for electronic components and the molding thickness of the sensor substrate. In contrast, the molding process used in the present application, as shown in FIGS. 6 and 9, can directly form and encapsulate electronic components, with a minimum thickness of about 0.2 millimeters (mm) measured between the adhesive fixing space and the electronic components in a Z-axis. It also allows a VCM (i.e., the lens assembly) to be completely adhered and fixed on a plane so formed, reducing an original forming thickness required for the VCM disposed on the substrate on which the sensor is arranged, thereby reducing the height of a VCM module (i.e., the camera module).

Figure 8:
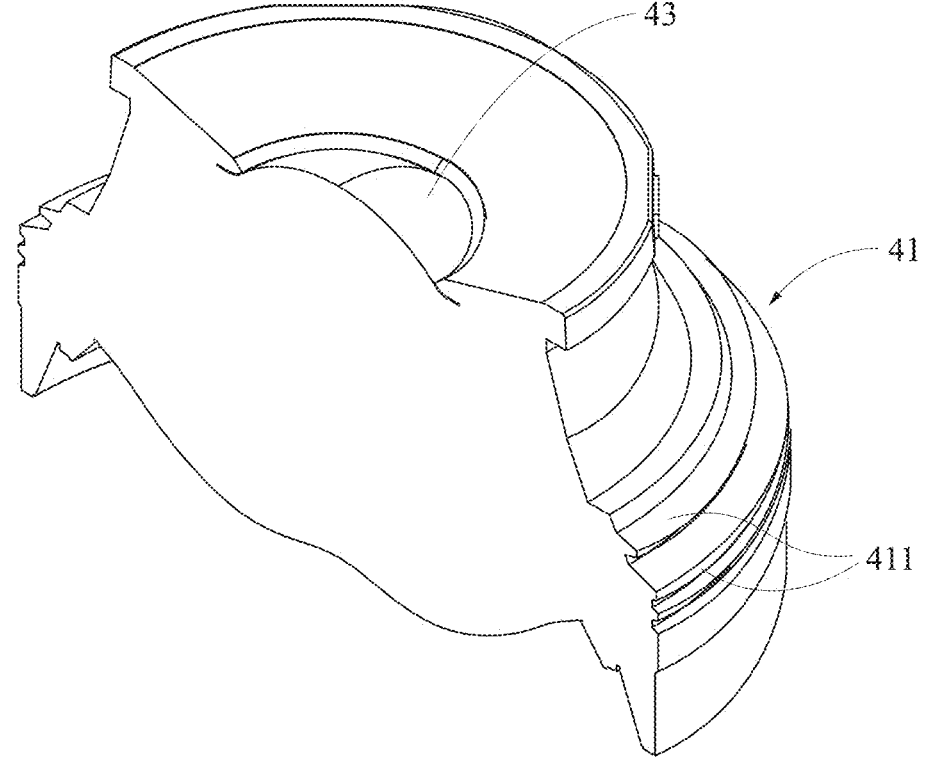
FIG. 8 is a schematic perspective view of a lens assembly in an embodiment of the present application.

Referring to FIGS. 8 and 9 in conjunction with FIG. 1, FIG. 8 is a schematic perspective view of the lens assembly in an embodiment of the present application, and FIG. 9 is a schematic perspective cross-sectional view of the camera module taken along line A-A in FIG. 4. As shown in FIGS. 8 and 9, the lens assembly 40 is disposed on the encapsulation body 20 and includes a lens barrel 41, a driving element 42, and at least a lens 43 disposed in the lens barrel 41, and the lens barrel 41 is movably connected to the driving element 42. In some embodiments, the driving element 42 may be a motor. In detail, as shown in FIG. 8, the lens barrel 41 includes a holding member 411 disposed on a side wall of the lens barrel 41, and the driving element 42 includes an actuating member 421. As shown in FIG. 9, the holding member 411 protrudes from the side wall of the lens barrel 41 and extends toward the actuating member 421 of the driving element 42, and a portion of the holding member 411 is engaged with the actuating member 421, so that the holding member 411 is fixed to the actuating member 421. Through the above structure, the actuating member 421 can be driven by the driving element 42 and drive the lens barrel 41 to move, so that the lens barrel 41 is exposed to or hidden in the housing (not shown). Accordingly, the present application directly forms the holding member 411 on the surrounding side wall of the lens barrel 41, so that a carrier (i.e., the holding member 411) used to assemble the lens is integrated with the lens barrel 41, thereby eliminating the use of a traditional carrier attached to the driving motor. The driving element 42 reduces the thickness space of the carrier, so that the X-axis and Y-axis dimensions of the entire camera module 1 can also be reduced.

Figure 10:
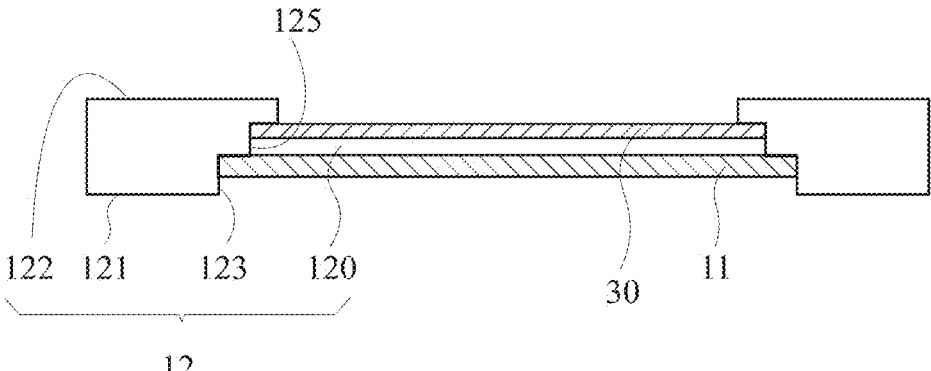
FIG. 10 is a schematic partial cross-sectional view of a camera module in another embodiment of the present application.

Referring to FIG. 10, FIG. 10 is a schematic partial cross-sectional view of a camera module in another embodiment of the present application. As shown in FIG. 10, in this embodiment, the substrate 12 includes a sub-stepped portion 125. The sub-stepped portion 125 is formed between the second side 122 and the first side 121 of the substrate 12 and is closer to the second side 122 than the stepped portion 123. In detail, the sub-stepped portion 125 and the stepped portion 123 form a continuous stair-like structure, which is different from the embodiments shown in FIGS. 1 to 6. Edges of the optical filter 30 shown in FIG. 10 are fixed in the sub-stepped portion 125, and is located on the same side of the substrate 12 as the sensor chip 11, which can also reduce the X-axis and Y-axis dimensions of the substrate 12.

Accordingly, in the present application, the sensor chip is disposed on the ceramic substrate through the flip chip process, so that a straight signal transmission path is formed between the sensor chip and the substrate, reducing the area required for horizontal wire bonding and for connecting contact pads to wire bonding pads of the substrate as used in prior art. In addition, the encapsulation body is laminated on the substrate through the molding process to directly cover the components on the substrate, reducing the assembly clearance required for the conventional sensor base and electronic components, thereby reducing the X-axis and Y-axis dimensions of the substrate, and providing better protection for the covered components. Furthermore, the lens barrel and the holding member are integrated, preventing the use of additional carriers, thus reducing the thickness of the carrier space for the driving element, and further reducing the X-axis and Y-axis dimensions of the entire camera module, thereby achieving the purpose of reducing the size of the camera module.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A camera module, comprising:
a sensor assembly comprising a sensor chip and a substrate, and the sensor chip arranged on the substrate;
an encapsulation body comprising an encapsulation bottom and a light-transmitting portion, and the encapsulation bottom extending to the light-transmitting portion and laminated on the substrate;
an optical filter located corresponding to the light-transmitting portion, wherein the optical filter is disposed on the substrate and facing the sensor chip; and
a lens assembly arranged on the encapsulation body.

2. The camera module of claim 1, wherein the light-transmitting portion passes through two opposite sides of the encapsulation body, and the encapsulation body comprises a flange located adjacent to and extending to the light-transmitting portion, and wherein the optical filter is arranged between the flange and the substrate, and the flange covers edges of the optical filter.

3. The camera module of claim 1, wherein the substrate comprises a first side and a second side arranged opposite to each other and a hollow portion located corresponding to the optical filter and passing through the first side and the second side, the sensor chip is arranged adjacent to the hollow portion, and a side portion of the sensor chip is connected to the first side of the substrate.

4. The camera module of claim 3, wherein the encapsulation body and the optical filter are arranged on the second side of the substrate, respectively, and the hollow portion is located between the optical filter and the sensor chip.

5. The camera module of claim 4, wherein the substrate comprises a stepped portion, the stepped portion is concave from the first side of the substrate toward the second side and is located adjacent to the hollow portion, and the side portion of the sensor chip is arranged on the stepped portion.

6. The camera module of claim 1, wherein the sensor assembly comprises an electronic component arranged on the substrate, and the encapsulation body covers the electronic component.

7. The camera module of claim 1, wherein the lens assembly is arranged on the encapsulation body and comprises a lens barrel and a driving element, and the lens barrel is movably connected to the driving element.

8. A camera module, comprising:
a sensor assembly comprising a sensor chip and a substrate, and the sensor chip arranged on the substrate;
an encapsulation body disposed on the substrate;
an optical filter disposed on the substrate and facing the sensor chip; and
a lens assembly arranged on the encapsulation body and comprising a lens barrel and a driving element, wherein the lens barrel comprises a holding member arranged on a side wall of the lens barrel, and the driving element comprises an actuating member, wherein the holding member is held by the actuating member, protrudes from the side wall of the lens barrel, and extends in a direction toward the actuating member, wherein and the actuating member is driven by the driving element and drives the lens barrel to move.

9. The camera module of claim 8, wherein a portion of the holding member is engaged with the actuating member of the driving element.

* * * * *